United States Patent [19]

Groth

[11] 4,272,997
[45] Jun. 16, 1981

[54] DRIVE MECHANISM
[75] Inventor: Willis G. Groth, Geneva, Ill.
[73] Assignee: H. A. Phillips & Co., St. Charles, Ill.
[21] Appl. No.: 934,407
[22] Filed: Aug. 17, 1978
[51] Int. Cl.³ .............................................. F16H 27/02
[52] U.S. Cl. .................................................. 74/89.22
[58] Field of Search ........................ 74/89, 89.2, 89.22

[56] References Cited
U.S. PATENT DOCUMENTS

| 3,044,312 | 7/1962 | Hall et al. | 74/89.22 |
|---|---|---|---|
| 3,273,408 | 9/1966 | Nagel et al. | 74/89.22 X |
| 3,372,599 | 3/1968 | Bratschi | 74/89.2 |
| 3,500,692 | 3/1970 | Sangster et al. | 74/89.22 |

Primary Examiner—Roy D. Frazier
Assistant Examiner—Robert W. Gibson, Jr.

Attorney, Agent, or Firm—Richard G. Lione

[57] ABSTRACT

A drive mechanism for converting rotary to linear movement. A portion of a drive cable is wrapped around a drive shaft. Rotation of the shaft causes the wrapped cable portion to take up a perpendicularly extending cable portion on one end, and feed out a perpendicularly extending cable portion on the other end. As it does so, the wrapped cable portion moves axially along the drive shaft. The diameter of the drive shaft and its site of rotation determine the speed of take-up, and feed out. Axial movement of the wound portion on the drive shaft is determined either by the pitch of the threads in a threaded section on the drive shaft, or the movement of control means on an externally threaded control shaft.

5 Claims, 3 Drawing Figures

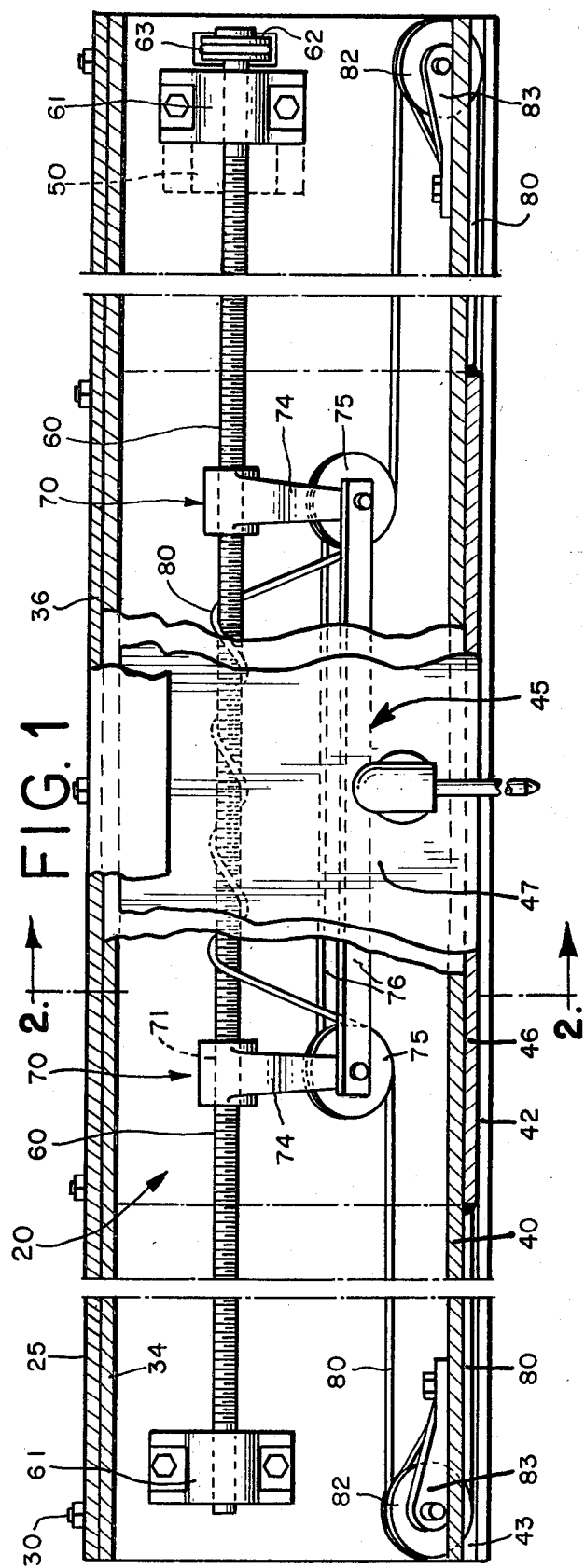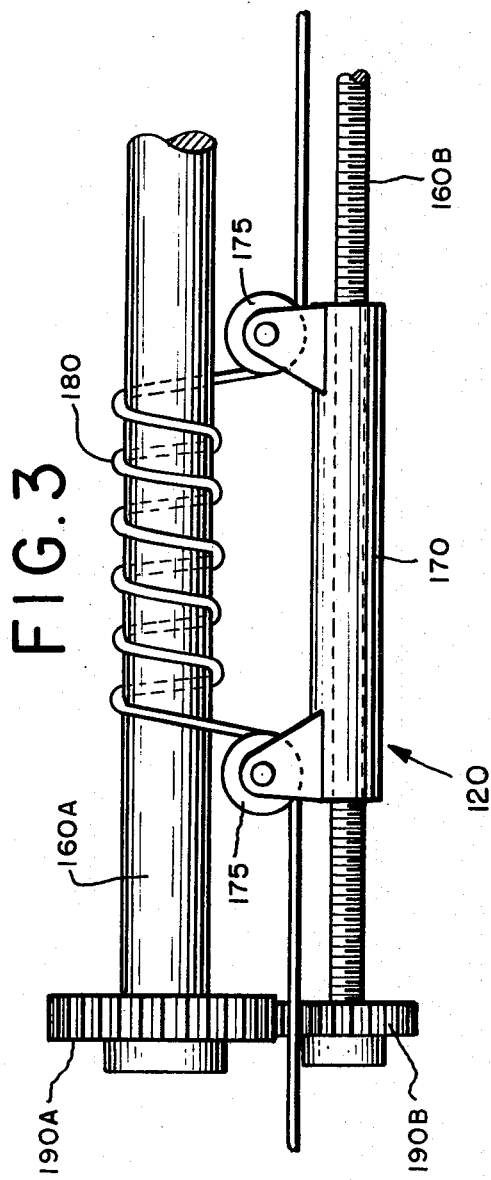

DRIVE MECHANISM

FIELD OF THE INVENTION

This invention is in the field of power transmission. It relates particularly to a drive mechanism for converting rotary to linear movement in a power transmission circuit.

BACKGROUND OF THE INVENTION

There are extant a wide variety of drive mechanisms for converting rotary to linear movement in a power transmission circuit. Of particular interest to those skilled in the art when considering the present invention is the Hall et al. U.S. Pat. No. 3,044,312. Also of interest in this regard are the Bratschi U.S. Pat. No. 3,372,599; the Nagel et al. U.S. Pat. No. 3,273,408; and the Morris U.S. Pat. No. 2,598,709. The complexity and, consequently, the cost of these drive mechanisms have minimized their value and restricted their use, however.

SUMMARY OF THE INVENTION

An object of the present invention is to provide a new and improved threaded shaft-cable drive mechanism which produces highly effective conversion of rotary to linear movement in a compact and inexpensive power transmission.

It is another object to provide a threaded shaft-cable drive mechanism for converting rotary to linear movement which has a more simple and efficient cable arrangement.

The foregoing and other objects are realized by providing a threaded shaft-cable drive mechanism which converts rotary movement of the threaded shaft to linear movement of a welding head, for example, to which the cable is connected. The cable is simply wrapped several times around the threaded portion of the shaft. Opposite end portions of the cable are then lead perpendicularly from the shaft to free pulleys which are mounted on brackets threaded onto the shaft. Here the cable portions change directions to parallel the shaft. Reversal of the cable portions around free pulleys at the travel limits of the welding head lead to attachment of the head. By proper selection of thread pitch, rotation of the shaft may, for instance, be made effective to move the brackets (and wound cable) up to ten inches on the shaft and produce a corresponding movement in the head of up to ten feet. An operator controls the speed and direction of shaft rotation by controlling a shaft drive motor.

In an alternative form of the invention, the main or drive shaft is not threaded. Movement of the wound cable portion on the drive shaft is controlled by a separate threaded control shaft.

BRIEF DESCRIPTION OF THE DRAWINGS

The invention, including its construction and method of operation, together with additional objects and advantages thereof, is illustrated more or less diagrammatically in the drawings, in which:

FIG. 1 is a diagrammatic front elevational view of a drive mechanism embodying features of one form of the invention adapted to drive an arc welding unit during a welding operation, with parts removed.

FIG. 3 is a view similar to FIG. 1 showing a second form.

DESCRIPTION OF THE PREFERRED EMBODIMENT

Figure 2:
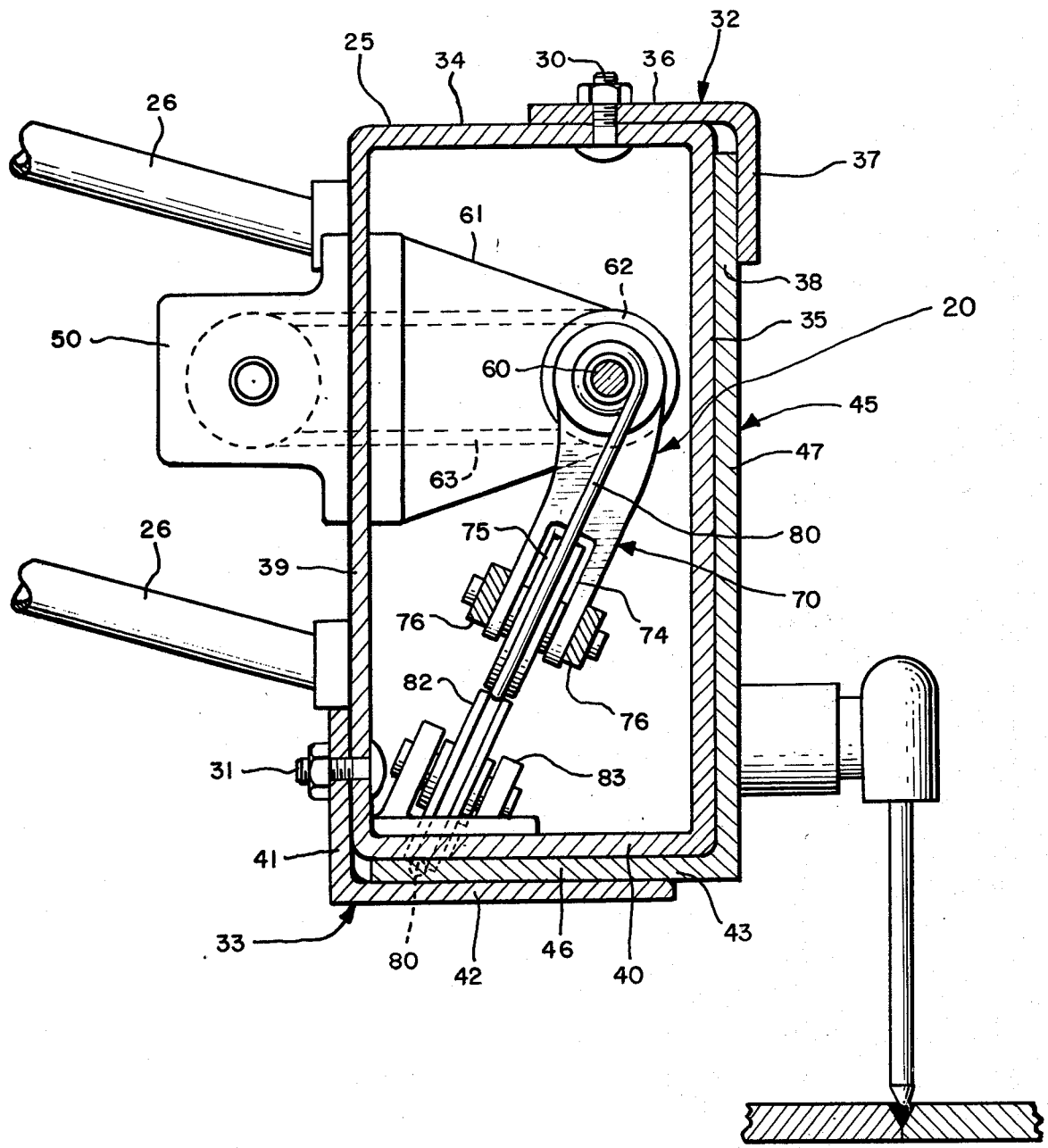
FIG. 2 is a view taken along line 2—2 of FIG. 1.

Referring now to the drawings, the construction and operation of the present invention is illustrated in the context of means for driving; i.e., moving, a welding head. The welding head is moved in a welding operation along a seam by a drive mechanism 20 embodying features of the present invention. Operation of the drive mechanism 20 is effective to move the welding head in either direction under the control of an operator.

The drive mechanism 20 includes a carrier tube 25 of rectangular cross-section which extends the length of the proposed welding path. The tube 25 is fabricated of sheet steel one eighth inch thick suitably formed and welded. In the present illustration, the tube 25 is ten feet long; the desired welding path length.

The tube 25 is suitably supported from the welding unit superstructure (not shown) by support members 26. The welding head travels along the tube 25 in a manner hereinafter discussed as it performs its welding operation.

The carrier tube 25 has cross-sectional dimensions of eighth inches by four inches. Coextensive with it and bolted to it by corresponding bolts 30 and 31 are welding head retainer and guide plates 32 and 33, respectively. The plate 32 is bolted to the top wall 34 of the tube and extends outwardly of the front wall 35 of the tube. The plate 32 is generally L-shaped with its longer leg 36 seated on the top wall 34 while its short foot 37 extends downwardly in front of the front wall 35 defining a three-eighth inch space 38 therebetween.

The plate 33 is bolted to the back wall 39 of the tube 25 and extends below its bottom wall 40. The plate 33 is also generally L-shaped in configuration but has its shorter foot 41 bolted to the back wall 38 while its longer leg 42 extends parallel to and below the bottom wall 40 so as to define a three-eighths inch space 43 therebetween.

The welding head includes a larger, generally L-shaped mounting plate 43. The shorter foot 46 of the mounting plate 45 is at the bottom and is disposed in the space 43 defined between the retainer and guide place 33 and the bottom wall 40 of the tube 25. The longer, upstanding leg 47 of the mounting plate 45 extends upwardly into the space 38 defined between the retainer and guide plate 32 and the front wall 35 of the tube 25. As will hereinafter be discussed, the mounting plate 45 is thus retained and guided for sliding movement on the tube 25.

The sliding movement of the mounting plate 45 is effected by an electric drive motor 50 through the drive mechanism 20 embodying features of the present invention. The drive mechanism 20 is substantially contained within the confines of the carrier tube 25.

The drive mechanism 20 includes a shaft 60 which, in the illustrated embodiment, is approximately twenty-four inches in length and is threaded for a distance of twenty inches intermediate its ends. The shaft 60 is journaled at its opposite ends, for rotation about its own axis, in bearing supporting members 61 which extend inwardly of the tube 25 from the back wall 39 of the tube.

A drive pulley 62 is mounted on one end of the shaft 60 adjacent a corresponding bearing support member 61. The drive pulley 62 is connected to the drive motor 50 through a conventional belt drive 63. Operation of the drive motor 50 is effective to rotate the shaft 60 at a desired speed.

Mounted on the threaded portion of the shaft 60 are two depending brackets 70. Each bracket 70 includes an internally threaded member 71 through which the shaft 60 is threaded. The brackets 70 are disposed three to four inches apart on the shaft 60. Approximately nine or ten inches of shaft then extend outwardly of each bracket 70 when the welding head 11 is centered.

Each bracket 70 also has depending from its member 71 a pair of legs 74 which carry a free pulley 75 therebetween. The legs 74 are inclined inwardly from the front wall 35 of the carrier tube 25, as illustrated, so that the pulley 75 is inclined at an angle to the wall. A connecting strut 76 extends between each of the brackets 70 at the lower ends of legs 74 adjacent corresponding pulleys 75.

Wrapped around the shaft 60 for four turns between the threaded bracket members 71 is a drive cable 80. Oppositely extending portions of the cable 80 pass downwardly under corresponding pulleys 75 in the manner best illustrated in FIG. 1 and then extend outwardly through the carrier tube 25 toward corresponding opposite ends of the tube.

The outwardly extending portions of the drive cable 80 reach reversal pulleys 82 at corresponding, opposite ends of the carrier tube 25. The reversal pulleys 82 are mounted on suitable brackets 83 welded to corresponding opposite ends of the carrier tube 25 and are also inclined, as illustrated.

The cable 80 portions pass around each of the reversal pulleys 82 and in doing so pass out of the carrier tube 25 and into the space 43 defined between the bottom wall 40 of the tube and the longer leg 42 on the guide plate 33. Each cable portion terminates in a free end which is secured by welding or the like to corresponding opposite ends of the mounting plate 45 within the confines of the aforementioned space 43.

In operation, the drive motor 50 rotates the shaft 60 in either direction at the instance of the operator; i.e., it is reversible. The motor 50 is also a variable speed device so the shaft 60 rotation speed can be adjusted.

Rotation of the shaft 60 in a clockwise (CW) direction (FIG. 2) causes cable 80 to be unwound from the shaft adjacent the right bracket 70 (FIG. 1) while it is wound onto the shaft adjacent the left bracket 70. This action draws the mounting plate 45 to the left (FIG. 1), moving the welding head 11 with it.

As the shaft 60 rotates the brackets 70 and wound cable portion move along it following the thread pitch. In the embodiment shown, the pitch is such that a ten inch movement on the shaft produces a ten foot movement of the welding head. By varying the pitch or the shaft diameter the ratio may be changed.

To ease the sliding movement of the plate 45 anti-friction material such as graphite or the like is introduced between the upstanding leg 47 of the plate 45 and depending foot 37 of the guide plate 32. Similarly, anti-friction material is introduced between the horizontal foot 46 of the plate 45 and the corresponding leg 42 of the guide plate 33.

As the welding head is drawn in either direction by the drive mechanism 20, the depending brackets 70 with their pulleys 75 are subjected to stresses acting parallel to the shaft. The connecting strut 76 between these brackets 70 at the pulleys 75 serves to prevent bracket deformation under these stresses.

The drive mechanism 20 has been described in terms of direct control of the shaft 60 pitch; i.e., the pitch is selected and movement of the cable and brackets 70 on the shaft is a direct function of the pre-selected pitch. The invention contemplates indirect control of the cable wrap pitch as well.

Referring to FIG. 3, a drive mechanism embodying a second form of the invention is illustrated schematically at 120. Instead of a single shaft, the drive mechanism 120 has two shafts 160A and 160B.

Shaft 160B has a pre-selected pitch which is the "control" pitch, as shall be seen. An internally threaded bracket 170 is threaded onto the shaft 160B and mounts the pulleys 175 above it. The cable 180 is wrapped around the shaft 160A and then passes around the pulleys 175.

The shafts 160A and 160B are connected by gears 190A and 190B sized to rotate the shafts in proper relationship based on their relative diameters. Either one of the shafts may be driven by an operator controlled motor in the manner hereinbefore discussed in relation to drive mechanism 20.

In operation, the pitch of the shaft 160B controls movement of the cable 180 on the shaft 160A. As such, the effective pitch of the shaft 160A is controlled, insofar as its effect on the cable 180 is concerned.

While the embodiment described herein is at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A mechanism for converting rotary to linear movement, comprising:
    a. a drive shaft having external threads formed on a section thereof,
    b. means for rotating said drive shaft about its own axis,
    c. internally threaded bracket means mounted on said threaded drive shaft section for movement therealong as said drive shaft is rotated,
    d. said bracket means having cable direction changing means mounted thereon,
    e. drive cable means having a cable portion wrapped around said threaded drive shaft section and having oppositely extending cable portions extending generally perpendicularly away from said drive shaft,
    f. said oppositely extending cable portions adapted to be connected to said driven means, and
    g. said oppositely extending cable portions tracking around said direction changing means whereby said cable portions then extend generally parallel to said drive shaft.

2. The drive mechanism of claim 1 further characterized by and including:
    a. tubular means substantially enclosing said drive shaft and bracket means and having oppositely disposed open free ends,
    b. said cable portions extending generally parallel to said drive shaft from said direction changing pulleys until said cable portions extend out said open free ends of said tubular means,
    c. reversal pulley means mounted at corresponding opposite free ends of said tubular means and said cable portions extending generally parallel to said drive shaft tracking around said reversal pulley means to where said cable portions then extend generally parallel to said drive shaft and away from said open free ends of said tubular means.

3. The drive mechanism of claim 2 further characterized by and including:
   a. guide means on said tubular means for retaining and guiding said driven means for movement along the length of said tubular means,
   b. rotation of said drive shaft being effective to move said driven means along said tubular means in a ratio of wrapped cable portion movement to driven means movement determined by the pitch of said threads in said threaded shaft section.

4. A drive mechanism for converting rotary to linear movement, comprising:
   (a) a drive shaft,
   (b) means for rotating said drive shaft about its own axis,
   (c) a drive cable having opposite free ends and being continuous between those free ends,
   (d) an intermediate portion of said drive cable between the free ends being wrapped around said drive shaft and oppositely extending cable portions extending generally perpendicularly away from said drive shaft,
   (e) said oppositely extending cable portions adapted to be connected to driven means,
   (f) rotation of said drive shaft being effective solely through frictional engagement with said intermediate cable portion to take up one of said oppositely extending cable portions and pay out the other of said oppositely extending cable portions, and
   (g) means for controlling the rate of movement of said wrapped intermediate cable portion axially along said drive shaft as it is rotated.

5. The drive mechanism of claim 4 is further characterized in that:
   (a) said controlling means comprises external threads formed on a section of said drive shaft.

* * * * *